(12) United States Patent
Ozaki

(10) Patent No.: US 6,778,331 B2
(45) Date of Patent: Aug. 17, 2004

(54) ZOOM LENS SYSTEM

(75) Inventor: Hiroyasu Ozaki, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/431,464

(22) Filed: May 8, 2003

(65) Prior Publication Data

US 2003/0223122 A1 Dec. 4, 2003

(30) Foreign Application Priority Data

May 10, 2002 (JP) ....................................... 2002-135738

(51) Int. Cl.⁷ ............................................. G02B 15/14
(52) U.S. Cl. ..................... 359/690; 359/683; 359/689
(58) Field of Search ................................. 359/683, 687, 359/689, 690

(56) References Cited

U.S. PATENT DOCUMENTS

| | | | |
|---|---|---|---|
| 4,494,828 A | * 1/1985 | Masumoto et al. | 359/690 |
| 4,815,829 A | * 3/1989 | Yamanashi et al. | 359/690 |
| 5,311,361 A | * 5/1994 | Nozawa | 359/690 |
| 5,347,399 A | 9/1994 | Yoneyama et al. | 359/690 |
| 5,448,412 A | 9/1995 | Maruyama et al. | 359/687 |
| 5,587,841 A | 12/1996 | Ito | 359/689 |
| 6,052,235 A | 4/2000 | Ozaki | 359/686 |
| 6,212,017 B1 | 4/2001 | Murata | 359/690 |
| 6,385,400 B1 | 5/2002 | Murata et al. | 396/79 |
| 6,483,649 B2 | 11/2002 | Ozaki | 359/690 |

FOREIGN PATENT DOCUMENTS

| JP | 8160301 | 6/1996 |
|---|---|---|
| JP | 10148758 | 6/1998 |
| JP | 2001188169 | 7/2001 |

OTHER PUBLICATIONS

English Language Translation of JP Appln. No. 8–160301.

* cited by examiner

*Primary Examiner*—David N. Spector
(74) *Attorney, Agent, or Firm*—Greenblum & Bernstein, P.L.C.

(57) ABSTRACT

A zoom lens system includes a first to a third lens groups. Upon zooming, the distance between the first and second lens groups increases, the distance between the second and third lens groups decreases. Each lens group is positioned closest to the object at the long focal length extremity. The third lens group includes first and second sub-lens groups. The first sub-lens group with at least one aspherical surface is positioned at the object-side end a reference distance, and the negative second sub-lens group is positioned at the image-side end thereof. The zoom lens system satisfies the following conditions: $1.7 < fw/f3 < 2.5 \ldots (1)$; $-0.5 < fw/f3b < -0.2 \ldots (2)$; $-45 < \Delta Iasp < -20 \ldots (3)$;

wherein, fw: the focal length of the entire zoom lens system at the short focal length extremity; f3: the focal length of the third lens group at the short focal length extremity; f3b: the focal length of the first sub-lens group at the short focal length extremity; and $\Delta Iasp$: the aberration coefficients of the for the aspherical-surface terms with respect to the third-order aberration coefficients of the aspherical surface under the condition that the focal length of the entire lens system at the short focal length extremity is converted to 1.0.

4 Claims, 9 Drawing Sheets

Fig. 1

Fig. 2A
F_NO.=1: 4.6
— d Line
······ g Line
--- C Line
-0.5    0.5
SPHERICAL
ABERRATION
CHROMATIC
ABERRATION Fig. 2B
W=16.0°
-0.05   0.05
LATERAL
CHROMATIC
ABERRATION Fig. 2C
W=16.0°
— S
-- M
-0.5    0.5
ASTIGMATISM Fig. 2D
W=16.0°
-5 (%) 5
DISTORTION

Fig. 5

Fig. 6A
FNo.= 1: 4.6

-0.5  0.5
SPHERICAL
ABERRATION
CHROMATIC
ABERRATION

Fig. 6B
W=16.0°

-0.05  0.05
LATERAL
CHROMATIC
ABERRATION

Fig. 6C
W=16.0°

-0.5  0.5
ASTIGMATISM

Fig. 6D
W=16.0°

-5 (%) 5
DISTORTION

— d Line
······ g Line
---- C Line

— S
-- M

Fig. 7A FNo.= 1: 5.4 — SPHERICAL ABERRATION CHROMATIC ABERRATION (d Line, g Line, C Line)

Fig. 7B W=6.0° — LATERAL CHROMATIC ABERRATION

Fig. 7C W=6.0° — ASTIGMATISM (S, M)

Fig. 7D W=6.0° — DISTORTION

Fig. 8A FNo.= 1: 6.2 — SPHERICAL ABERRATION CHROMATIC ABERRATION (d Line, g Line, C Line)

Fig. 8B W=4.2° — LATERAL CHROMATIC ABERRATION

Fig. 8C W=4.2° — ASTIGMATISM (S, M)

Fig. 8D W=4.2° — DISTORTION

Fig. 9

Fig. 10A
FNo.= 1: 4.6

-0.5  0.5
SPHERICAL
ABERRATION

CHROMATIC
ABERRATION

——— d Line
······· g Line
----- C Line

Fig. 10B
W=16.0°

-0.05  0.05
LATERAL
CHROMATIC
ABERRATION

-0.5  0.5
ASTIGMATISM

Fig. 10D
W=16.0°

-5 (%) 5
DISTORTION

ZOOM LENS SYSTEM

BACKGROUND OF THE INVENTION

1. Field of the Invention

The present invention relates to a telescopic zoom lens system having a zoom ratio of approximately 4, for use in a single lens reflex camera having a long back focal distance.

2. Description of the Prior Art

As an example of a telescopic zoom lens system for a single lens reflex camera having a zoom ratio of approximately 4, there is known, for example, Japanese Unexamined Patent Publications (JUPP) No. Hei-8-160301 and U.S. Pat. No. 6,052,235 which disclose a zoom lens system of a four-lens-group arrangement; however the overall length of the zoom lens system disclosed in each publication is relatively longer, and is not compact. Furthermore, in JUPP No. Hei-8-160301, the number of lens elements is 14; and in JUPP No. Hei-10-148758, the number of lens elements is 12 to 14. Accordingly, in these publications, the number of lens elements is relatively larger, so that cost reduction becomes difficult.

In a zoom lens system disclosed in JUPP No. 2001-188169, the number lens elements is about 11, which is relatively few; however, the zoom ratio is about 3, and the overall length of the zoom lens system is not short.

SUMMARY OF THE INVENTION

The present invention provides a telescopic zoom lens system for a single lens reflex camera, having a relatively short overall length, and being produced at low cost. Furthermore, the present invention provides a telescopic zoom lens system, having a zoom ratio of approximately 4, and including a smaller number of lens elements.

According to an aspect of the present invention, there is provided a zoom lens system including a positive first lens group, a negative second lens group, and a positive third lens group, in this order from the object. Upon zooming from the short focal length extremity to the long focal length extremity, all of the positive first lens group, the negative second lens group and the positive third lens group are moved. The distance between the positive first lens group and the negative second lens group increases, the distance between the negative second lens group and the positive third lens group decreases. Each of the positive first lens group, the negative second and positive third lens group is positioned closest to the object at the long focal length extremity.

The positive third lens group includes a positive first sub-lens group and a negative second sub-lens group, in this order from the object. More specifically, the positive first sub-lens group is positioned at the object-side end of a reference distance which is defined as the longest distance formed between lens elements of said positive third lens group at the short focal length extremity, and the negative second sub-lens group is positioned at the image-side end of the reference distance.

In addition, the positive first sub-lens group is provided with at least one aspherical surface.

The zoom lens system satisfies the following conditions:

$$1.7 < fw/f3 < 2.5 \quad (1)$$

$$-0.5 < fw/f3b < -0.2 \quad (2)$$

$$-45 < \Delta Iasp < -20 \quad (3)$$

wherein fw designates the focal length of the entire zoom lens system at the short focal length extremity;

f3 designates the focal length of the third lens group at the short focal length extremity;

f3b designates the focal length of the second sub-lens group at the short focal length extremity; and $\Delta Iasp$ designates the aberration coefficients of the aspherical-surface terms with respect to the third-order aberration coefficients of the aspherical surface under the condition that the focal length of the entire lens system at the short focal length extremity is converted to 1.0.

In regard to the positive first sub-lens group and the negative second sub-lens group, it is possible to set a state where a relative position therebetween is fixed, and a state where these sub-lens groups are relatively moved upon zooming. The above-described "the longest distance between lens elements in the positive third lens group at the short focal length extremity" means a concept when the positive first sub-lens group and the negative second sub-lens group are relatively moved. On the other hand, in the case where these lens groups are not relatively moved, the above definition is simply read as "the longest distance between lens elements in the positive third lens group".

If an attempt is made to employ an aspherical surface in the positive first sub-lens group of the positive third lens group, the correcting of spherical aberration can effectively be made, and the number of lens elements can be reduced. Consequently, production costs can be reduced. Furthermore, in addition to achieving the fewer number of lens elements due to the aspherical surface, if the positive third lens group is constituted as a telephoto-type lens group so that the positive third lens group satisfies condition (2), the overall length of the entire zoom lens system can be made shorter.

The aspherical surface can be formed on a glass lens element or a plastic lens element. On the other hand, the aspherical surface can be formed as a hybrid type in which the aspherical surface is formed on a transparent resin material layer attached on a spherical glass lens element.

In the case where the aspherical surface is formed on a plastic lens element, the aspherical surface preferably satisfies the following condition:

$$0 < fw/fp < 0.2 \quad (4)$$

wherein fp designates the focal length of the plastic aspherical lens element in the positive first sub-lens group.

The positive first lens group preferably includes a positive lens element, a negative lens element, and a positive lens element, in this order from the object.

The negative second lens group can include a negative lens element, a positive lens element, and a negative lens element, in this order from the object.

The first sub-lens group preferably includes a positive aspherical lens element made of glass or a hybrid-type aspherical lens element, a positive lens element and a negative lens element, in this order from the object.

The second sub-lens group preferably includes a positive lens element, and a negative lens element, in this order from the object.

The entire zoom lens system includes eleven lens elements in total.

The positive first lens group preferably includes a positive lens element, a negative lens element, and a positive lens element, in this order from the object.

The negative second lens group can include a negative lens element, a positive lens element, and a negative lens element, in this order from the object.

The first sub-lens group preferably includes a positive lens element, a positive lens element, a negative lens element, and a positive aspherical lens element made of plastic, in this order from the object.

The second sub-lens group preferably includes a positive lens element, and a negative lens element, in this order from the object.

The entire zoom lens system includes twelve lens elements in total.

The present disclosure relates to subject matter contained in Japanese Patent Application No. 2002-135738 (filed on May 10, 2002) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 17:
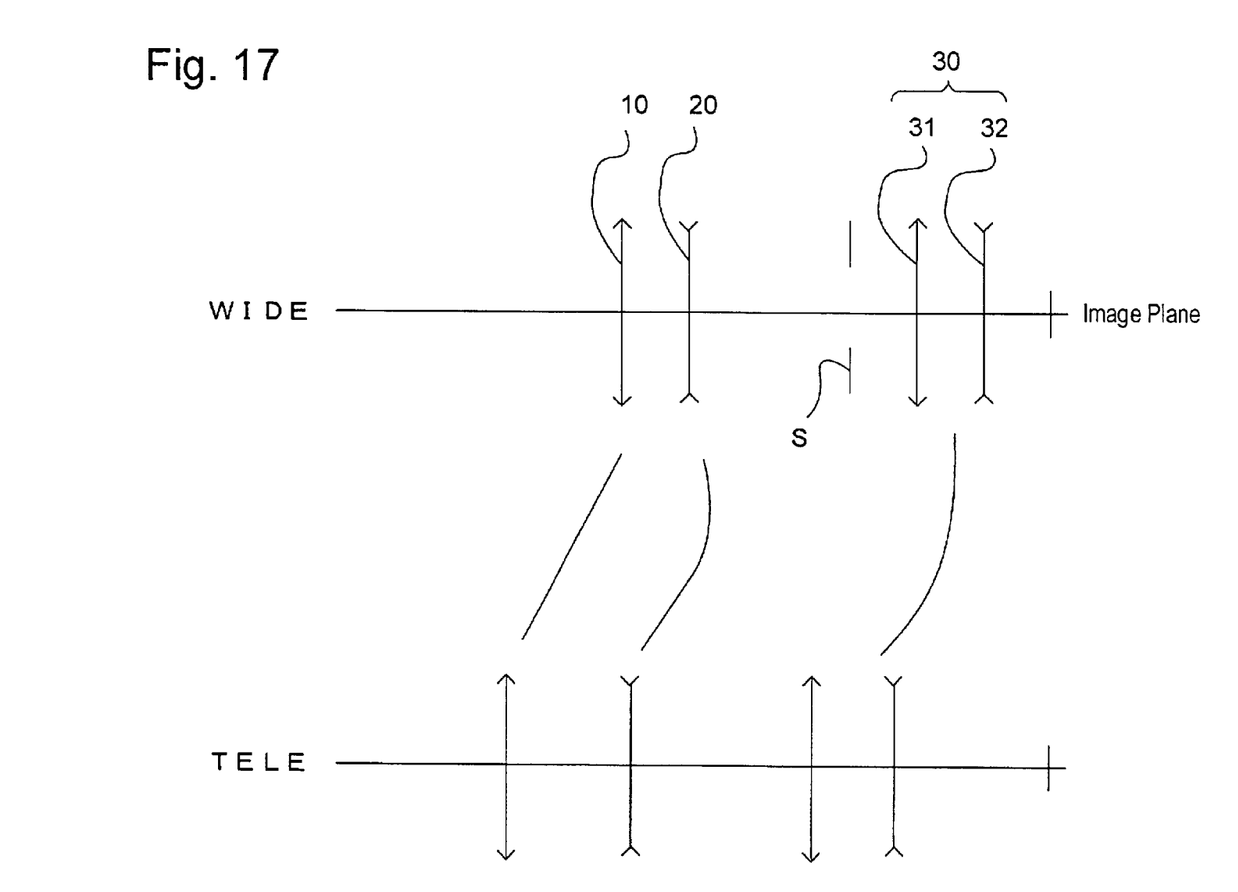
FIG. 17 shows a schematic lens-group moving paths of the zoom lens system according to the present invention.

A zoom lens system according to the present invention, as shown in the zoom path of FIG. 17, includes a positive first lens group 10, a negative second lens group 20 and the positive third lens group 30, in this order from the object.

Upon zooming from the short focal length extremity to the long focal length extremity, all of the positive first lens group 10, the negative second lens group 20 and the positive third lens group 30 are moved from the image to the object.

Each of the positive first lens group, the negative second and the positive third lens group is positioned closest to the object at the long focal length extremity.

The distance between the positive first lens group 10 and the negative second lens group 20 increases, and the distance between the negative second lens group 20 and the positive third lens group 30 decreases.

The third lens group 30 includes a positive first sub-lens group 31 and a negative second sub-lens group 32. More specifically, the positive first sub-lens group 31 is positioned at the object-side end of a reference distance which is defined as the longest distance formed between lens elements in the positive third lens group at the short focal length extremity, and the negative second sub-lens group 32 is positioned at the image-side end of the reference distance.

In the case where the positive first sub-lens group 31 and the negative second sub-lens group 32 are not relatively moved upon zooming, the above-described longest distance between lens elements in the positive third lens group is constant (no change).

Focusing from infinity to an object at a closer distance is performed by moving the positive first lens group 10 toward the object.

Conditions (1), (2) and (3) respectively relate to the first sub-lens group 31 having an aspherical surface therein. By satisfying these conditions (1) to (3), the optical power (hereinafter, power) of the positive third lens group 30 and the effect on the correcting of aberrations due to the aspherical surface can be appropriately determined, so that the zoom lens system can be constituted by have a smaller number of lens elements, and the zoom lens system can be made compact.

Condition (1) specifies the focal length of the positive third lens group.

If fw/f3 exceeds the lower limit of condition (1), the power of the positive third lens group 30 becomes too weak, so that the overall length of the zoom lens system becomes longer. As a result, it is difficult to achieve a compact zoom lens system.

If fw/f3 exceeds the upper limit of condition (1), the power of the third lens group 30 becomes too strong, so that aberrations, such as spherical aberration or the like, largely occur. As a result, aberrations cannot be corrected even if the aspherical surface is utilized. Furthermore, the back focal distance becomes shorter, so that the zoom lens system is not appropriate for a single lens reflex camera.

Condition (2) specifies the focal length of the negative second sub-lens group 32, and indirectly specifies the focal length of the positive first sub-lens group 31.

If fw/f3b exceeds the lower limit of condition (2) is exceeded, the negative power of the second sub-lens group 32 becomes too strong, so the function of the positive third lens group 30 as a telephoto-type lens system becomes too large. Consequently, the correcting aberrations is difficult.

If fw/f3b exceeds the upper limit of condition (2), the negative power of the second sub-lens group 32 becomes too weak, so that the overall length of the zoom lens system becomes longer. Accordingly, further miniaturization of the zoom lens system becomes difficult.

Condition (3) specifies the aberration coefficients of the aspherical surface, and in particular, relates to the effect on the correcting of spherical aberration by the aspherical surface.

If ΔIasp exceeds the lower limit of condition (3), the aberration coefficients of the aspherical surface become too small, so that spherical aberration which occurs in the positive third lens group cannot effectively be corrected.

If ΔIasp exceeds the upper limit of condition (3), the aberration coefficients of the aspherical surface become too large, so that the sensitivity to production error or assembling error becomes undesirably high.

Condition (4) specifies the focal length of a plastic lens element in the positive first sub-lens group 31 in the case where the aspherical surface is formed on the plastic lens element.

In the positive first sub-lens group 31 which as a whole has a positive power, the a plastic lens element with the aspherical surface is preferably arranged to share a part of the positive power of the positive first sub-lens group 31.

If fw/fp exceeds the lower limit of condition (4), the power of the plastic aspherical lens element becomes 0 or negative, so that the power of the positive lens element in the positive first sub-lens group 31 has to make stronger. Consequently, aberrations in the positive first sub-lens group 31 become larger, and the occurrence of aberrations due to relative decentration between the positive first sub-lens group 31 and the negative second sub-lens group 32 becomes larger.

If fw/fp exceeds the upper limit condition (4), the power of the plastic aspherical lens element becomes too strong. Consequently, a focal shift due to a change in temperature of the plastic aspherical lens element increases, and cannot be adequately corrected.

Specific numerical data of the embodiments will be described hereinafter. In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, F$_{NO}$ designates the f-number, f designates the focal length of the entire zoom lens system, f$_B$ designates the back focal distance, W designates the half angle-of-view (°), r designates the radius of curvature, d designates the lens-element thickness or distance between lens elements, N$_d$ designates the refractive index of the d-line, and v$_d$ designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Furthermore, the relationship between the aspherical coefficients and aberration coefficients is discussed as follows:

1. The shape of an aspherical surface is defined as follows:

$$x=cy^2/(1+[1\{1+K\}c^2y^2]^{1/2})+A4y^4+A6y^6+A8y^8+A10y^{10}$$

wherein:
x designates a distance from a tangent plane of an aspherical vertex;
y designates a distance from the optical axis;
c designates a curvature of the aspherical vertex (1/r),
K designates a conic constant;

2. In this equation, to obtain the aberration coefficients, the following substitution is made to replace K with "0" (Bi=Ai when K=0).

B4=A4+Kc$^3$/8;
B6=A6+(K$^2$+2K)c$^5$/16;
B8=A8+5(K$^3$+3K$^2$+3K)c$^7$/128
B10=A10+7(K$^4$+4K$^3$+6K$^2$+4K)c$^9$/256; and therefore, the following equation is obtained:

$$x=cy^2/[1+[1-c^2y^2]^{1/2}]+B4y^4+B6y^6+B8y^8+B10y^{10+\cdots}$$

3. Furthermore, in order to normalize the focal length f to 1.0, the followings are considered:

x=x/f; Y=y/f; C=f*c;
α4 =f$^3$B4; α6=f$^5$B6; α8=f$^7$B8; α10=f$^9$B10
Accordingly, the following equation is obtained.

$$X=CY^2/[1+[1-C^2Y^2]^{1/2}]+\alpha4Y^4+\alpha6Y^6+\alpha8Y^8+\alpha10Y^{10}+\ldots$$

4. Φ=8(N'−N)α4 is defined, and the third aberration coefficients are defined as follows:

I designates the spherical aberration coefficient;
II designates the coma coefficient;
III designates the astigmatism coefficient;
IV designates the curvature coefficient of the sagittal image surface; and
V designates a distortion coefficient; and therefore, the influence of the fourth-order aspherical-surface coefficient (α4) on each aberration coefficient is defined as:

| |
|---|
| Δ I = h$^4$Φ |
| Δ II = h$^3$kΦ |
| Δ III = h$^2$k$^2$Φ |
| Δ IV = h$^2$k$^2$Φ |
| Δ V = hk$^3$Φ | wherein
h1 designates the height at which a paraxial axial light ray strikes the first surface of the lens system including the aspherical surface;
h designates the height at which the paraxial axial light ray strikes the aspherical surface when the height h1 is 1;
k1 designates the height at which a paraxial off-axis ray, passing through the center of the entrance pupil, strikes the first surface of the lens system including the aspherical surface;
k designates the height at which the paraxial off-axis light ray strikes the aspherical surface when the height k1 is −1;
N' designates the refractive index of a medium on the side of the image with respect to the aspherical surface; and
N designates the refractive index of a medium on the side of the object with respect to the aspherical surface.

Embodiment 1

Figure 1:
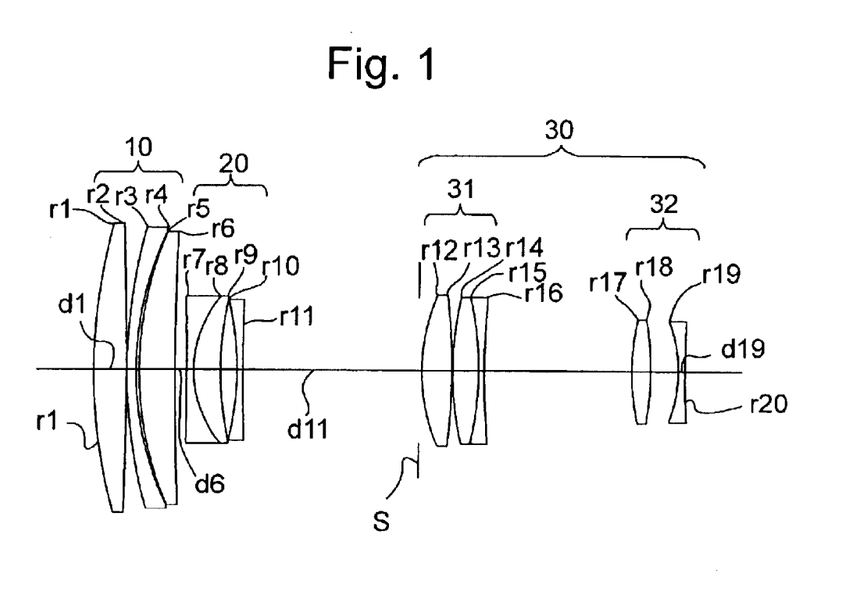
FIG. 1 is a lens arrangement of a zoom lens system, at the short focal length extremity, according to a first embodiment of the present invention.
Figures 2A, 2B:
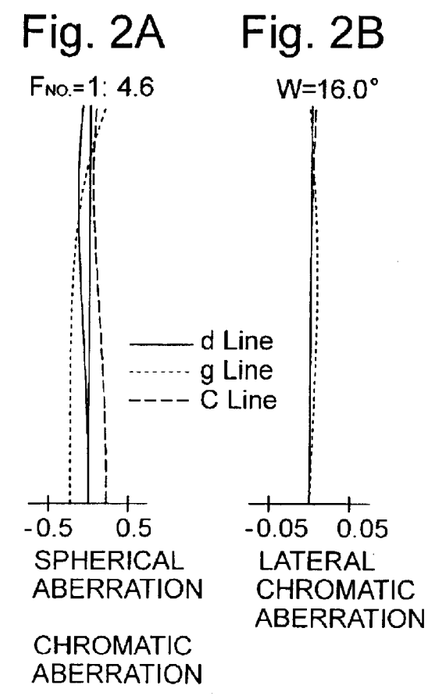
FIGS. 2A, 2B, 2C and 2D show aberrations occurred in the lens arrangement shown in FIG. 1.
Figure 2C:
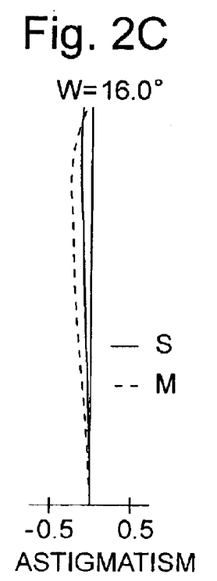
Figure 2D:
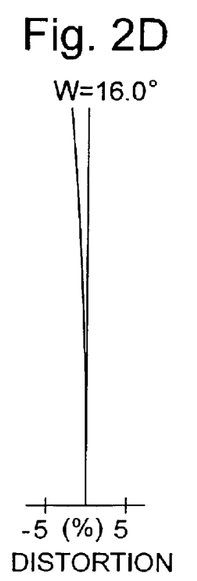
Figures 3A, 3B:
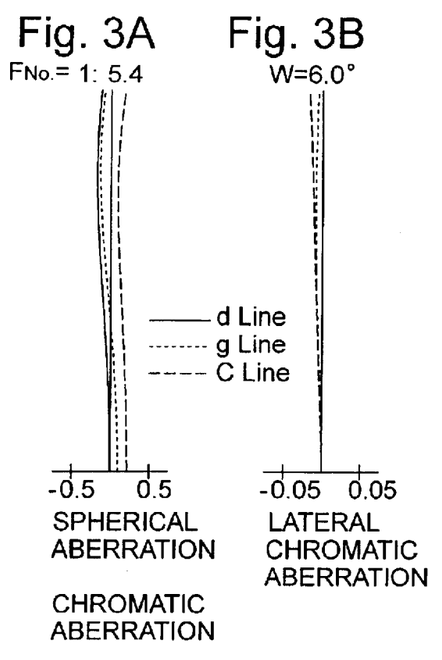
FIGS. 3A, 3B, 3C and 3D show aberrations occurred in the lens arrangement shown in FIG. 1 at an intermediate focal length.
Figure 3C:
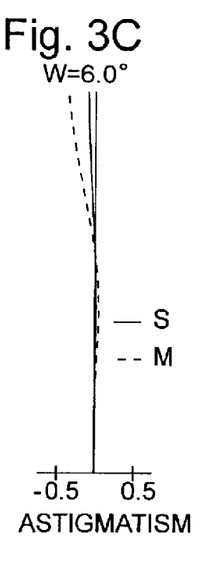
Figure 3D:
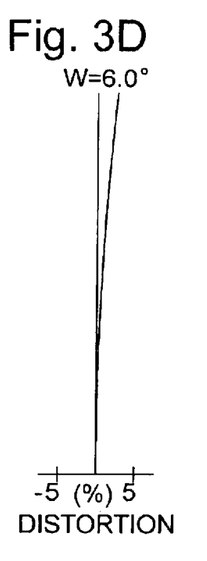
Figures 4A, 4B:
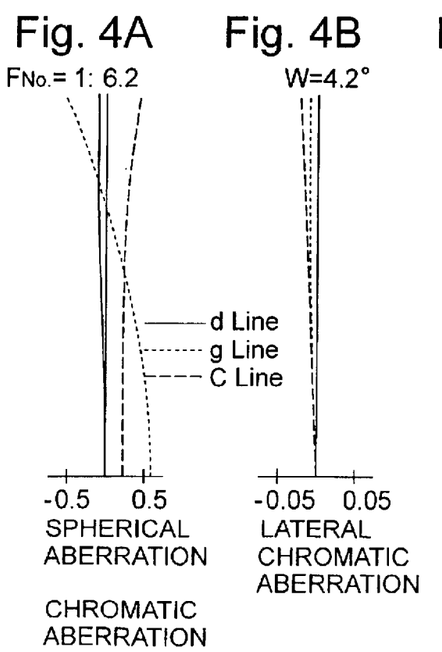
FIGS. 4A, 4B, 4C and 4D show aberrations occurred in the lens arrangement shown in FIG. 1 at the long focal length extremity.
Figure 4C:
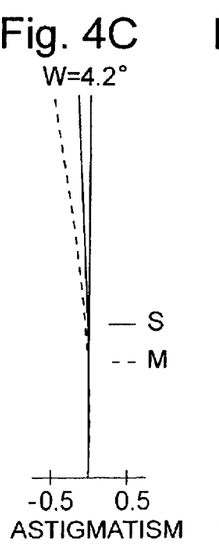
Figure 4D:
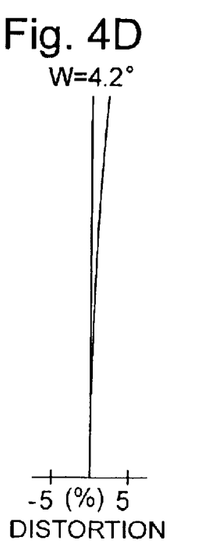

FIG. 1 is the lens arrangement of a zoom lens system, at the short focal length extremity, according to the first embodiment of the present invention. FIGS. 2A through 2D show aberrations occurred in the lens arrangement shown in FIG. 1. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical data of the first embodiment.

Surface Nos. 1 through 6 constitute the positive first lens group 10 (a positive lens element, a negative lens element, and a positive lens element), surface Nos. 7 through 11 constitute the negative second lens group 20 (a negative lens element, a positive lens element, and a negative lens element), surface Nos. 12 through 16 constitute the positive first sub-lens group 31 (a positive lens element, a positive lens element, and a negative lens element) of the positive third lens group 30, and surface Nos. 17 through 20 constitute the negative second sub-lens group 32 (a positive lens element and a negative lens element) of the positive third lens group 30.

The aspherical lens surface is formed on the object-side surface of the most-object side glass lens element (glass-molded lens element) of the positive first sub-lens group 31.

Note that the most-object side lens element of the positive first sub-lens group 31 can be formed as a hybrid lens element, and the aspherical surface can be formed on the object-side surface of the hybrid lens element.

TABLE 1

$F_{NO} = 1:4.6-5.4-6.6$
$W = 16.0-6.0-4.2$
$f = 77.25-200.01-289.95$
$f_B = 56.43-71.79-85.70$

| Surface No. | r | d | Nd | $v_d$ |
|---|---|---|---|---|
| 1 | 95.365 | 5.74 | 1.48749 | 70.2 |
| 2 | −727.230 | 0.10 | — | — |
| 3 | 91.304 | 1.60 | 1.80518 | 25.4 |
| 4 | 56.791 | 0.55 | — | — |
| 5 | 61.595 | 6.21 | 1.51633 | 64.1 |
| 6 | 555.784 | 2.00–41.28–47.95 | — | — |
| 7 | −612.980 | 1.20 | 1.74100 | 52.7 |
| 8 | 20.174 | 4.58 | 1.80518 | 25.4 |
| 9 | 56.107 | 2.87 | — | — |
| 10 | −53.265 | 1.00 | 1.83481 | 42.7 |
| 11 | 386.479 | 31.23–11.64–2.50 | — | — |
| 12* | 31.592 | 5.40 | 1.58913 | 61.2 |
| 13 | −107.775 | 0.10 | — | — |
| 14 | 55.462 | 4.62 | 1.48749 | 70.2 |
| 15 | −55.462 | 1.00 | 1.80518 | 25.4 |
| 16 | 144.073 | 25.70 | — | — |
| 17 | 43.218 | 3.22 | 1.64769 | 33.8 |
| 18 | −55.932 | 4.75 | — | — |
| 19 | −25.877 | 1.20 | 1.80400 | 46.6 |
| 20 | 147.884 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 12 | 0.00 | $-0.35622 \times 10^{-5}$ | $-0.11327 \times 10^{-8}$ | $-0.17079 \times 10^{-11}$ |

Embodiment 2

Figure 5:
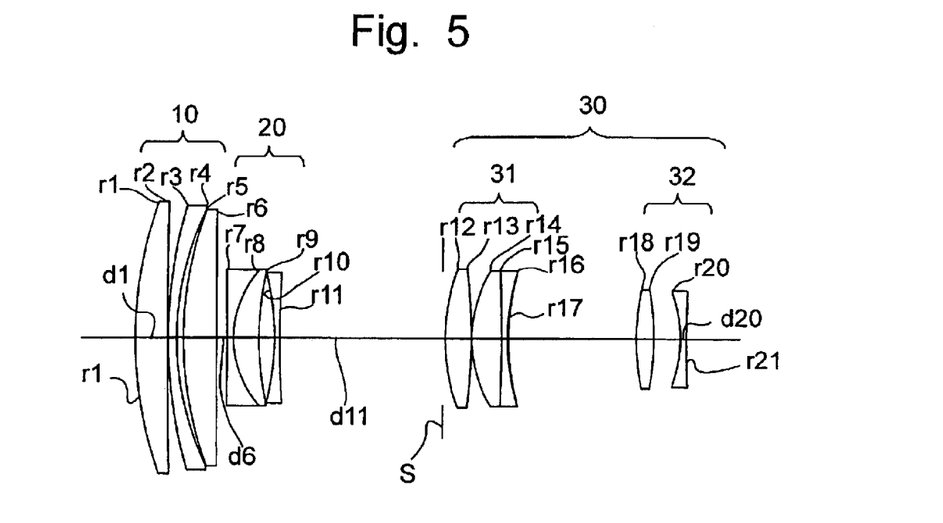
FIG. 5 is a lens arrangement of a zoom lens system, at the short focal length extremity, according to a second embodiment of the present invention.
Figures 6A, 6B:
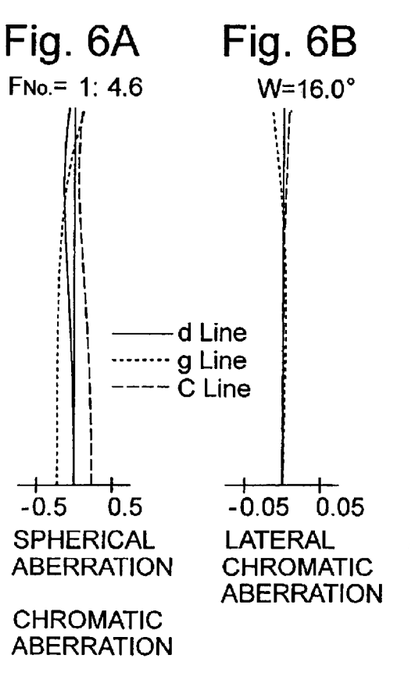
FIGS. 6A, 6B, 6C and 6D show aberrations occurred in the lens arrangement shown in FIG. 5.
Figure 6C:
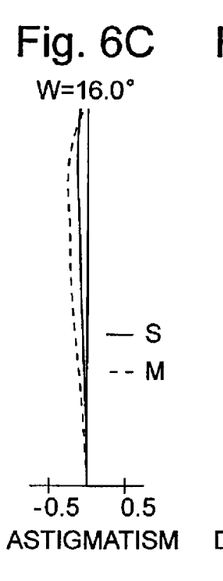
Figure 6D:
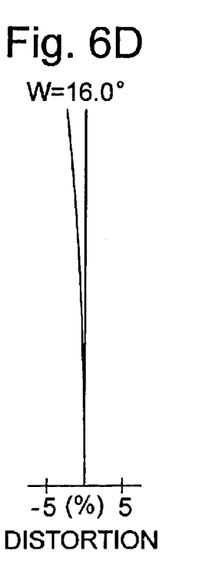
Figures 7A, 7B:
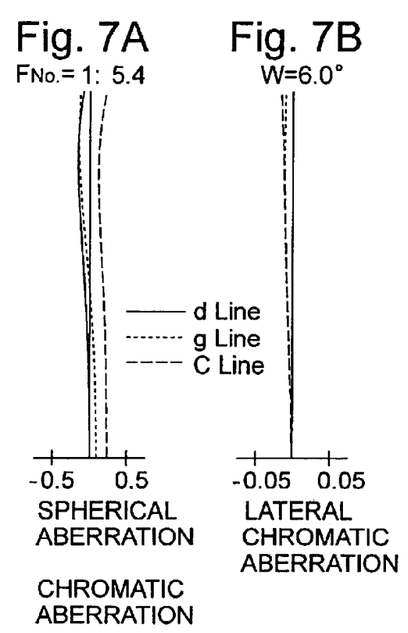
FIGS. 7A, 7B, 7C and 7D show aberrations occurred in the lens arrangement shown in FIG. 5 at an intermediate focal length.
Figure 7C:
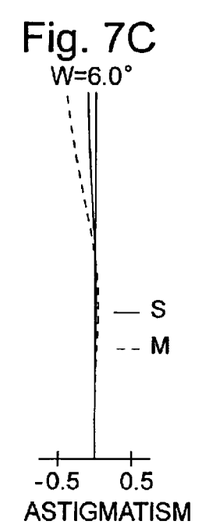
Figure 7D:
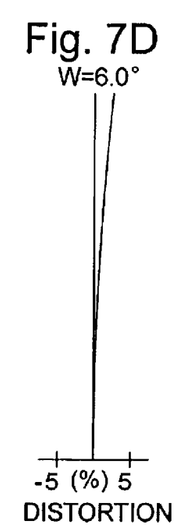
Figures 8A, 8B:
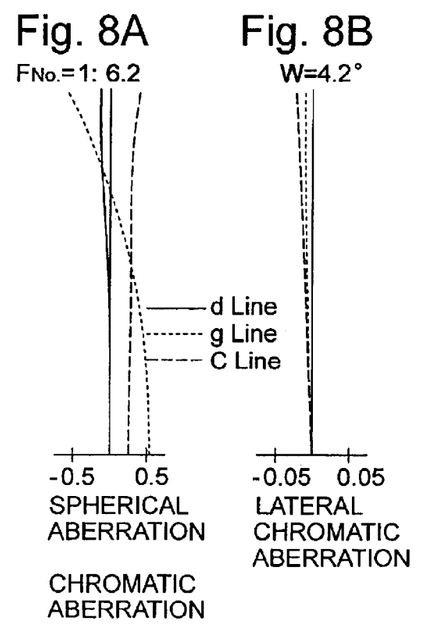
FIGS. 8A, 8B, 8C and 8D show aberrations occurred in the lens arrangement shown in FIG. 5 at the long focal length extremity.
Figure 8C:
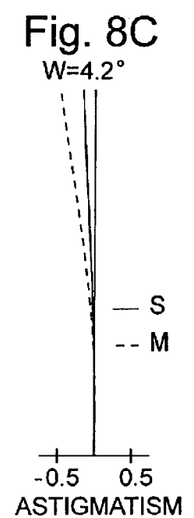
Figure 8D:
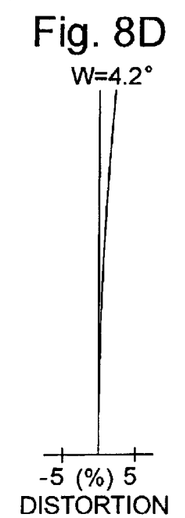

FIG. 5 is the lens arrangement of a zoom lens system, at the short focal length extremity, according to the second embodiment of the present invention. FIGS. 6A through 6D show aberrations occurred in the lens arrangement shown in FIG. 5. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical data of the second embodiment. The basic lens arrangement of the second embodiment is the same as that of the first embodiment.

The aspherical lens surface in the positive first sub-lens group 31 is formed on a transparent resin layer attached on the image-side surface of the most image-side spherical glass lens element.

TABLE 2

$F_{NO} = 1:4.6-5.4-6.2$
$W = 16.0-6.0-4.2$
$f = 77.25-200.00-289.96$
$f_B = 57.78-72.32-86.58$

| Surface No. | r | d | Nd | $v_d$ |
|---|---|---|---|---|
| 1 | 76.414 | 5.93 | 1.48749 | 70.2 |
| 2 | 1192.266 | 0.10 | — | — |
| 3 | 87.970 | 1.60 | 1.80518 | 25.4 |
| 4 | 55.400 | 1.22 | — | — |
| 5 | 68.652 | 6.09 | 1.51633 | 64.1 |
| 6 | 3673.768 | 2.00–41.30–47.65 | — | — |
| 7 | −615.957 | 1.20 | 1.73400 | 51.5 |
| 8 | 19.297 | 4.73 | 1.80518 | 25.4 |
| 9 | 55.660 | 2.82 | — | — |
| 10 | −52.890 | 1.00 | 1.80610 | 40.9 |
| 11 | 212.377 | 30.45–11.41–2.50 | — | — |
| 12 | 37.843 | 4.80 | 1.51633 | 64.1 |
| 13 | −104.394 | 0.10 | — | — |
| 14 | 25.137 | 5.46 | 1.48749 | 70.2 |
| 15 | −283.029 | 1.10 | 1.80518 | 25.4 |
| 16 | 43.698 | 0.20 | 1.52700 | 43.7 |
| 17* | 49.826 | 23.50 | — | — |
| 18 | 44.430 | 3.36 | 1.64769 | 33.8 |
| 19 | −50.253 | 4.95 | — | — |
| 20 | −24.878 | 1.10 | 1.80400 | 46.6 |
| 21 | 222.285 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 17 | 0.00 | $0.65887 \times 10^{-5}$ | $0.11114 \times 10^{-8}$ | $0.78836 \times 10^{-11}$ |

Embodiment 3

Figure 9:
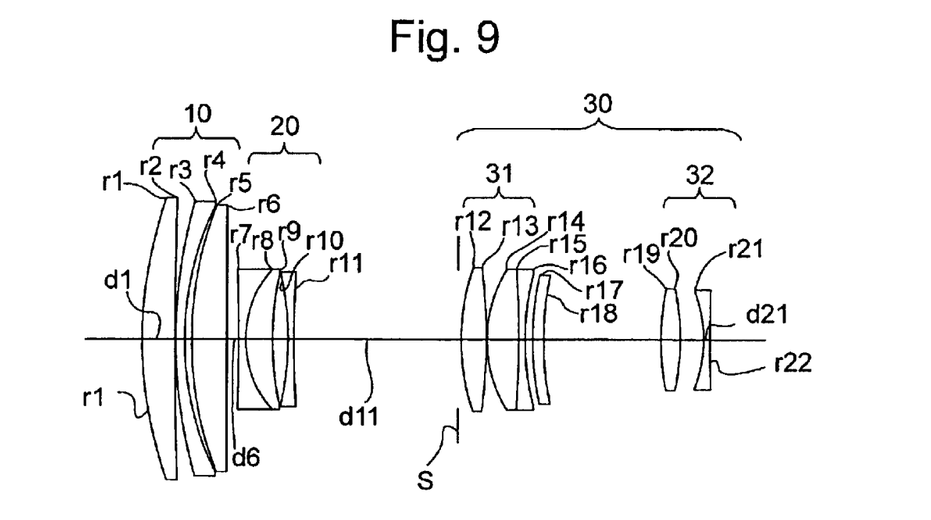
FIG. 9 is a lens arrangement of a zoom lens system, at the short focal length extremity, according to a third embodiment of the present invention.
Figures 10A, 10B:
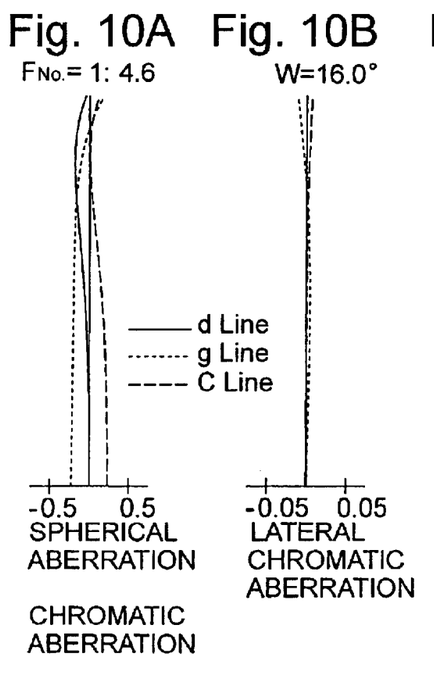
FIGS. 10A, 10B, 10C and 10D show aberrations occurred in the lens arrangement shown in FIG. 9.
Figure 10C:
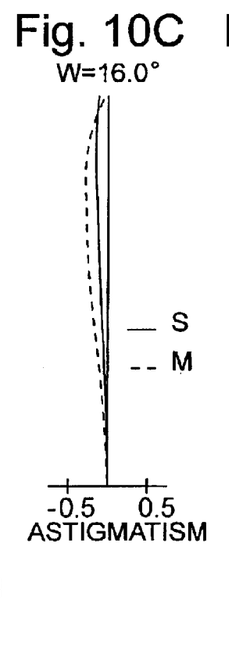
Figure 10D:
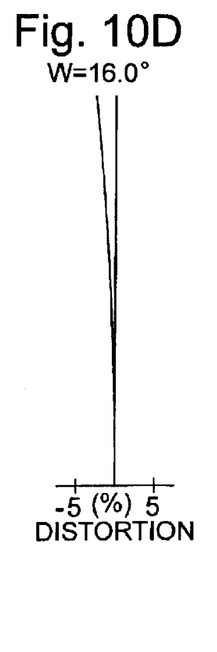
Figure 11A:
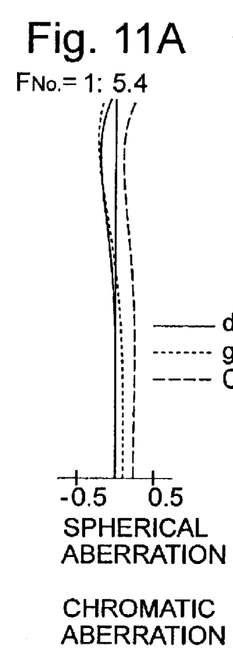
FIGS. 11A, 11B, 11C and 11D show aberrations occurred in the lens arrangement shown in FIG. 9 at an intermediate focal length.
Figure 11B:
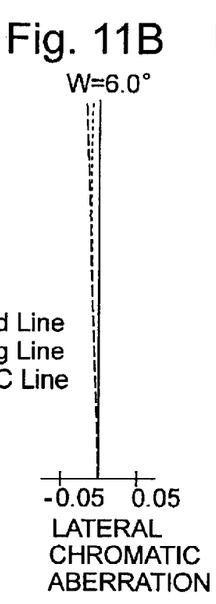
Figure 11C:
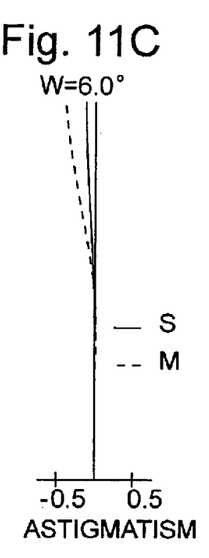
Figure 11D:
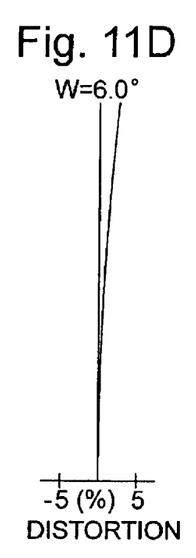
Figure 12A:
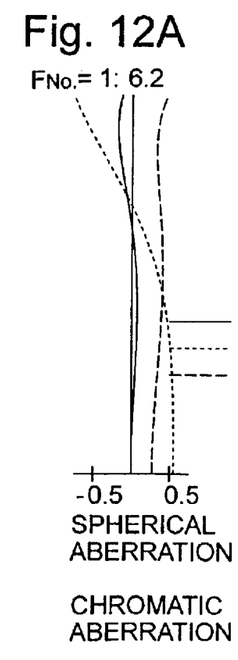
FIGS. 12A, 12B, 12C and 12D show aberrations occurred in the lens arrangement shown in FIG. 9 at the long focal length extremity.
Figure 12B:
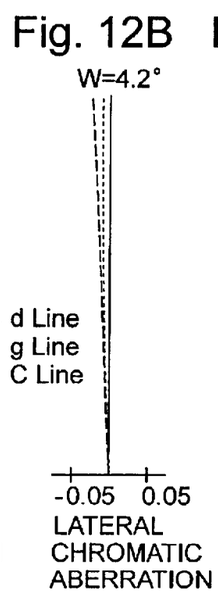
Figure 12C:
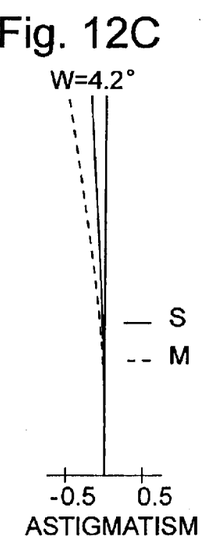
Figure 12D:
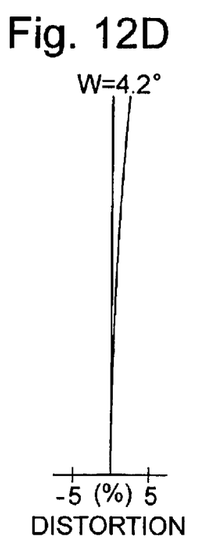

FIG. 9 is the lens arrangement of a zoom lens system, at the short focal length extremity, according to the third embodiment of the present invention. FIGS. 10A through 10D show aberrations occurred in the lens arrangement shown in FIG. 9. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical data of the third embodiment. The basic lens arrangement of the third embodiment is the same as that of the first embodiment except that the positive first sub-lens group 31 includes a positive lens element, a positive lens element, a negative lens element, and a positive plastic lens element, in this order from the object side.

The aspherical lens surface in the positive first sub-lens group 31 is formed on the image-side surface of the most image-side positive plastic lens element.

TABLE 3

$F_{NO} = 1:4.6-5.4-6.2$
$W = 16.0-6.0-4.2$
$f = 77.25-200.01-289.96$
$f_B = 58.97-73.19-87.56$

| Surface No. | r | d | Nd | $v_d$ |
|---|---|---|---|---|
| 1 | 76.154 | 5.84 | 1.51633 | 64.1 |
| 2 | 849.794 | 0.10 | — | — |
| 3 | 90.032 | 1.60 | 1.80518 | 25.4 |
| 4 | 54.587 | 1.26 | — | — |
| 5 | 66.472 | 6.32 | 1.51633 | 64.1 |
| 6 | 14468.316 | 2.09–41.03–47.23 | — | — |
| 7 | −358.787 | 1.20 | 1.73400 | 51.5 |
| 8 | 19.072 | 4.78 | 1.80518 | 25.4 |
| 9 | 56.616 | 2.77 | — | — |
| 10 | −53.066 | 1.00 | 1.80610 | 40.9 |
| 11 | 203.804 | 29.65–11.18–2.50 | — | — |
| 12 | 40.670 | 4.52 | 1.51633 | 64.1 |
| 13 | −101.825 | 0.10 | — | — |
| 14 | 24.587 | 5.64 | 1.48749 | 70.2 |
| 15 | −207.470 | 1.10 | 1.80518 | 25.4 |
| 16 | 47.627 | 1.34 | — | — |
| 17 | 53.671 | 2.00 | 1.52538 | 56.3 |
| 18* | 62.570 | 20.50 | — | — |
| 19 | 45.515 | 3.34 | 1.64769 | 33.8 |
| 20 | −45.515 | 4.19 | — | — |
| 21 | −24.623 | 1.10 | 1.80400 | 46.6 |
| 22 | 198.202 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 18 | 0.00 | $0.70890 \times 10^{-5}$ | $-0.18612 \times 10^{-8}$ | $0.14230 \times 10^{-10}$ |

Embodiment 4

Figure 13:
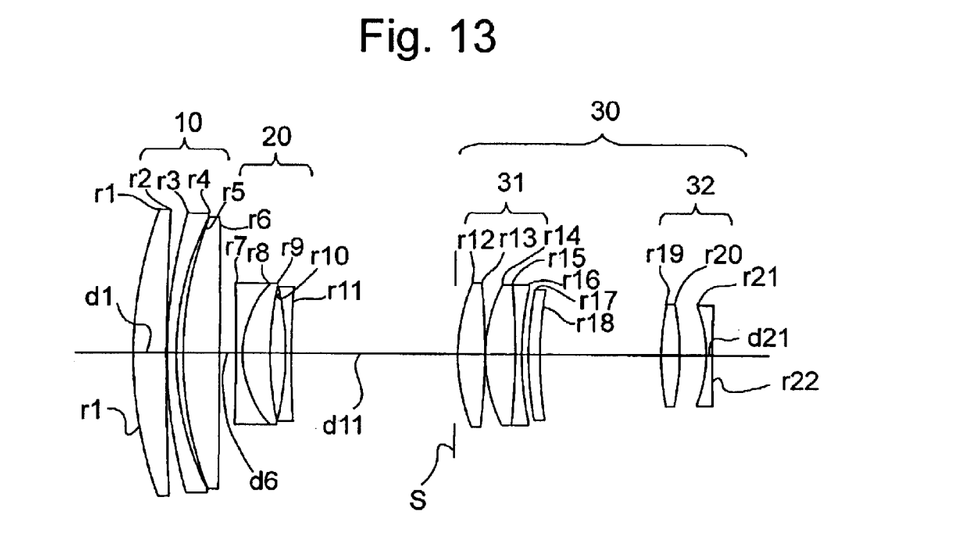
FIG. 13 is a lens arrangement of a zoom lens system, at the short focal length extremity, according to a fourth embodiment of the present invention.
Figures 14A, 14B:
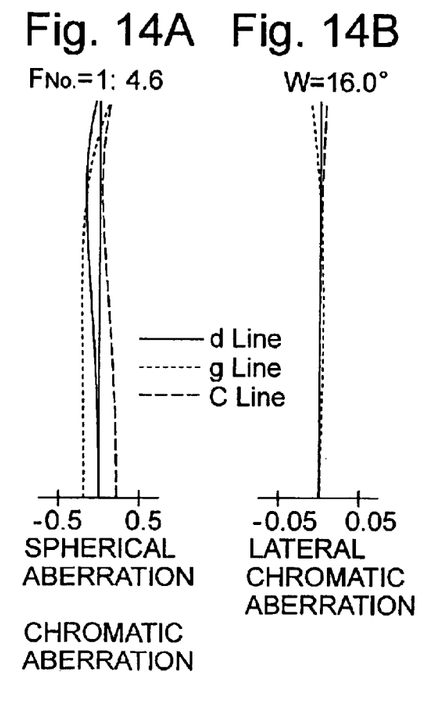
FIGS. 14A, 14B, 14C and 14D show aberrations occurred in the lens arrangement shown in FIG. 13.
Figure 14C:
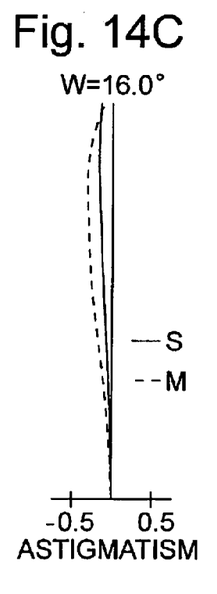
Figure 14D:
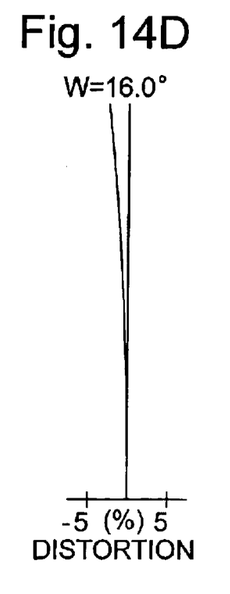
Figures 15A, 15B:
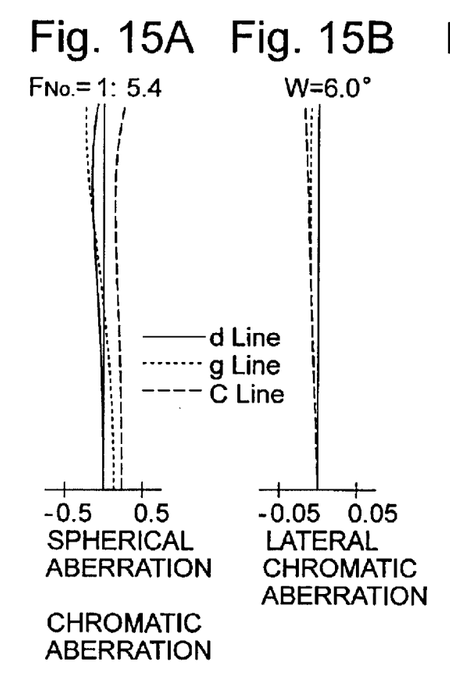
FIGS. 15A, 15B, 15C and 15D show aberrations occurred in the lens arrangement shown in FIG. 13 at an intermediate focal length.
Figure 15C:
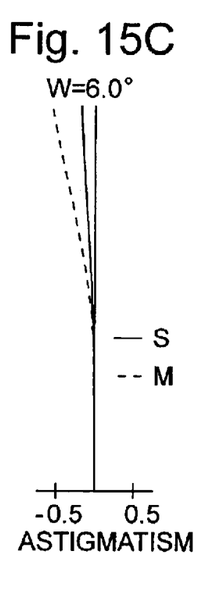
Figure 15D:
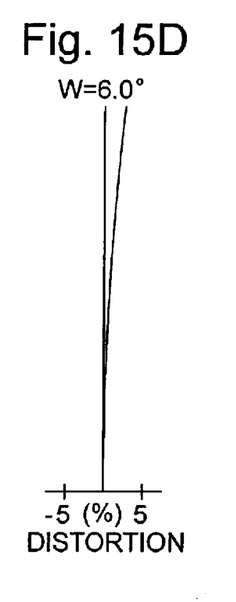
Figures 16A, 16B:
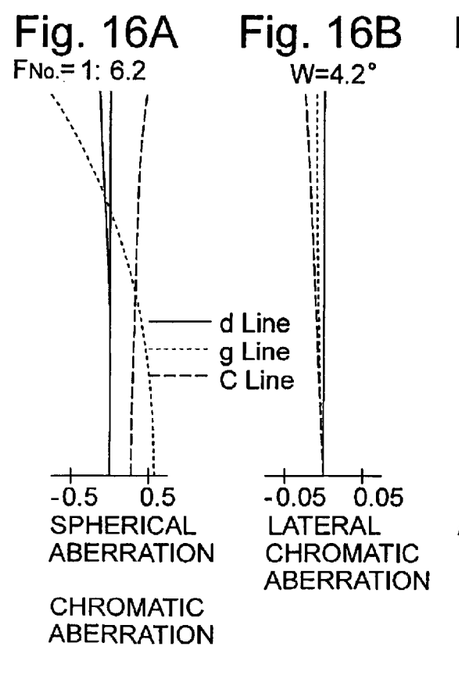
FIGS. 16A, 16B, 16C and 16D show aberrations occurred in the lens arrangement shown in FIG. 13 at the long focal length extremity.
Figure 16C:
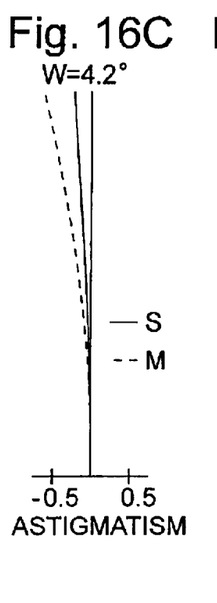
Figure 16D:
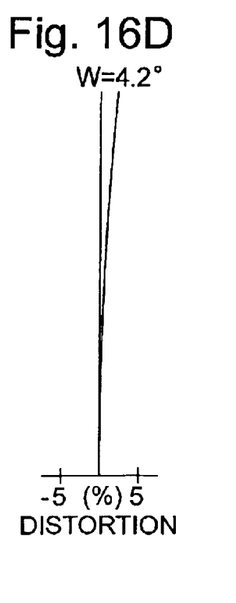

FIG. 13 is the lens arrangement of a zoom lens system, at the short focal length extremity, according to the fourth embodiment of the present invention. FIGS. 14A through 14D show aberrations occurred in the lens arrangement shown in FIG. 13. FIGS. 15A through 15D show aberrations occurred in the lens arrangement shown in FIG. 13 at an intermediate focal length. FIGS. 16A through 16D show aberrations occurred in the lens arrangement shown in FIG. 13 at the long focal length extremity. Table 4 shows the numerical data of the fourth embodiment. The basic lens arrangement of the fourth embodiment and the position of the aspherical lens surface in the positive first sub-lens group 31 is the same as that of the third embodiment.

TABLE 4

$F_{NO} = 1:4.6-5.4-6.2$
$W = 16.0-6.0-4.2$
$f = 77.25-200.00-289.96$
$f_B = 58.29-72.32-86.58$

| Surface No. | r | d | Nd | $v_d$ |
|---|---|---|---|---|
| 1 | 73.915 | 5.76 | 1.51633 | 64.1 |
| 2 | 532.171 | 0.10 | — | — |
| 3 | 89.348 | 1.60 | 1.80518 | 25.4 |
| 4 | 54.347 | 1.23 | — | — |
| 5 | 67.132 | 6.37 | 1.51633 | 64.1 |
| 6 | −2630.845 | 2.85–42.04–48.11 | — | — |
| 7 | −442.085 | 1.20 | 1.73400 | 51.5 |
| 8 | 18.713 | 4.76 | 1.80518 | 25.4 |
| 9 | 55.149 | 2.75 | — | — |
| 10 | −52.066 | 1.00 | 1.80610 | 40.9 |
| 11 | 187.704 | 29.05–11.01–2.50 | — | — |
| 12 | 34.305 | 4.75 | 1.48749 | 70.2 |
| 13 | −120.745 | 0.10 | — | — |
| 14 | 28.015 | 5.29 | 1.51633 | 64.1 |
| 15 | −135.711 | 1.10 | 1.80518 | 25.4 |
| 16 | 55.039 | 1.23 | — | — |
| 17 | 65.753 | 2.00 | 1.52538 | 56.3 |
| 18* | 80.111 | 21.12 | — | — |
| 19 | 47.926 | 3.20 | 1.64769 | 33.8 |
| 20 | −47.926 | 4.64 | — | — |
| 21 | −25.014 | 1.10 | 1.80400 | 46.6 |
| 22 | 252.943 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 18 | 0.00 | $0.78128 \times 10^{-5}$ | $0.13296 \times 10^{-8}$ | $0.77529 \times 10^{-11}$ |

Table 5 shows the numerical values of each condition for each embodiment.

TABLE 5

|  | Embod. 1 | Embod. 2 | Embod. 3 | Embod. 4 |
|---|---|---|---|---|
| Cond. (1) | 2.050 | 2.065 | 2.085 | 2.113 |
| Cond. (2) | −0.360 | −0.229 | −0.254 | −0.258 |
| Cond. (3) | −38.596 | −38.810 | −36.923 | −41.603 |
| Cond. (4) | — | — | 0.116 | 0.116 |

According to the above description, a telescopic zoom lens system for a single lens reflex camera, having a relatively short overall length, having a zoom ratio of approximately 4, and being produced at low cost, can be obtained.

What is claimed is:

1. A zoom lens system comprising a positive first lens group, a negative second lens group, and a positive third lens group, in this order from an object, wherein upon zooming from the short focal length extremity to the long focal length extremity, all of said positive first lens group, said negative second lens group and said positive third lens group are moved;

wherein the distance between said positive first lens group and said negative second lens group increases, the distance between said negative second lens group and said positive third lens group decreases;

wherein each of said positive first lens group, said negative second and said positive third lens group is positioned closest to the object at the long focal length extremity;

wherein said positive third lens group comprises a positive first sub-lens group and a negative second sub-lens group, in this order from the object;

wherein said positive first sub-lens group is positioned at an object-side end of a reference distance which is defined as the longest distance formed between lens elements of said positive third lens group at the short focal length extremity, and said negative second sub-lens group is positioned at an image-side end of said reference distance;

wherein said positive first sub-lens group is provided with at least one aspherical surface; and wherein said zoom lens system satisfies the following conditions:

$1.7 < fw/f3 < 2.5$ $-0.5 < fw/f3b < -0.2$ $-45 < \Delta Iasp < -20$ wherein fw designates the focal length of the entire zoom lens system at the short focal length extremity;

f3 designates the focal length of said third lens group at the short focal length extremity;

f3b designates the focal length of said second sub-lens group at the short focal length extremity; and $\Delta Iasp$ designates the aberration coefficients of the aspherical-surface terms with respect to the third-order spherical-aberration coefficients of the aspherical surface under the condition that the focal length of the entire lens system at the short focal length extremity is converted to 1.0.

2. The zoom lens system according to claim 1, satisfying the following condition:

$0 < fw/fp < 0.2$ wherein fp designates the focal length of a plastic lens element, having the aspherical lens surface, provided in said positive first sub-lens group.

3. The zoom lens system according to claim 1, wherein said positive first lens group comprises a positive lens element, a negative lens group comprises a positive lens element, in this order from said object;

wherein said negative second lens group comprises a negative lens element, a positive lens element, and a negative lens element, in this order from said object;

wherein said first sub-lens group comprises a positive aspherical lens element made of glass or a hybrid-type aspherical lens element, a positive lens element and a negative lens element, in this order from said object;

wherein said second sub-lens group comprises a positive lens element, and a negative lens element, in this order from said object; and wherein said zoom lens system comprises eleven lens elements in total.

4. The zoom lens system according to claim 1, wherein said positive first lens group comprises a positive lens element, a negative lens element, and a positive lens element, in this order from said object;

wherein said negative second lens group comprises a negative lens element, a positive lens element, and a negative lens element, in this order from said object;

wherein said first sub-lens group comprises a positive lens element, a positive aspherical lens element made of plastic, in this order from said object;

wherein said second sub-lens group comprises a positive lens element, and a negative lens element, in this order from said object; and wherein said zoom lens system comprises twelve lens elements in total.

* * * * *